(12) United States Patent
Weipert et al.

(10) Patent No.: US 9,199,520 B2
(45) Date of Patent: Dec. 1, 2015

(54) ADJUSTABLE HITCH ASSEMBLY

(75) Inventors: Neal Weipert, Livonia, MI (US);
Richard W. McCoy, Granger, IN (US);
Jacob Belinky, Carleton, MI (US)

(73) Assignee: Cequent Towing Products, Plymouth, MI (US)

( * ) Notice: Subject to any disclaimer, the term of this patent is extended or adjusted under 35 U.S.C. 154(b) by 684 days.

(21) Appl. No.: 12/587,179

(22) Filed: Oct. 2, 2009

(65) Prior Publication Data

US 2010/0127479 A1 May 27, 2010

Related U.S. Application Data

(60) Provisional application No. 61/194,987, filed on Oct. 2, 2008.

(51) Int. Cl.
*B60D 1/46* (2006.01)
*B60D 1/54* (2006.01)
*B60D 1/14* (2006.01)
*B60D 1/07* (2006.01)
*B60D 1/42* (2006.01)
*B60D 1/52* (2006.01)

(52) U.S. Cl.
CPC .. *B60D 1/07* (2013.01); *B60D 1/42* (2013.01); *B60D 1/46* (2013.01); *B60D 1/52* (2013.01); *B60D 1/54* (2013.01)

(58) Field of Classification Search
CPC .......... B62D 1/54; B62D 1/542; B62D 1/544; B62D 1/546; B62D 1/42; B62D 1/44; B62D 1/469; B62D 1/06; B62D 1/065; B62D 1/07; B62D 1/24
USPC ................ 280/405.1, 407, 415, 416.1, 490.1, 280/491.3, 491.5, 166; D12/162
See application file for complete search history.

(56) References Cited

U.S. PATENT DOCUMENTS

| 2,823,930 | A |   | 2/1958  | Cooper |
|---|---|---|---|---|
| 3,400,949 | A |   | 9/1968  | Kendall |
| 3,922,006 | A |   | 11/1975 | Borges |
| 4,248,450 | A |   | 2/1981  | McWethy |
| 4,524,475 | A | * | 6/1985  | Valentino ........................ 5/507.1 |
| 4,662,647 | A |   | 5/1987  | Calvert |
| 5,725,229 | A |   | 3/1998  | McWethy |
| D397,067  | S | * | 8/1998  | McCoy et al. ................ D12/162 |
| 5,839,744 | A | * | 11/1998 | Marks ......................... 280/416.1 |
| 5,873,594 | A |   | 2/1999  | McCoy et al. |
| 5,890,727 | A |   | 4/1999  | May |
| 6,068,281 | A |   | 5/2000  | Szczypski |
| 6,116,631 | A | * | 9/2000  | Logan et al. ................... 280/483 |

(Continued)

*Primary Examiner* — Joseph Rocca
*Assistant Examiner* — Daniel Yeagley
(74) *Attorney, Agent, or Firm* — McDonald Hopkins LLC

(57) ABSTRACT

The present invention is directed to an adjustable hitch assembly for coupling a towed vehicle with a towing vehicle. An embodiment of the adjustable hitch assembly may include a base member, a ball support member, and a hitch ball member. The base member may include a connecting portion and a shank member, wherein the shank member may extends perpendicularly away from the connecting portion. The ball support member may include a support rod extending perpendicularly away from the shank member. The ball support member may also include an opening there though that may be attached to the shank member. The hitch ball member may be attached to the support rod, wherein the hitch ball member may have at least one accessory aperture. The connecting portion may be attached to the towing vehicle and the hitch ball member may be attached to the towed vehicle.

32 Claims, 16 Drawing Sheets

(56) References Cited

U.S. PATENT DOCUMENTS

| | | | | |
|---|---|---|---|---|
| 6,460,870 | B2 | 10/2002 | Moss | |
| 6,575,488 | B2 | 6/2003 | Massey | |
| 6,659,484 | B2 * | 12/2003 | Knodle et al. | 280/166 |
| 6,712,381 | B1 | 3/2004 | Moss | |
| 6,726,237 | B1 * | 4/2004 | Carrico | 280/490.1 |
| 6,789,815 | B2 | 9/2004 | Moss et al. | |
| 6,824,156 | B2 | 11/2004 | Smith | |
| 6,902,181 | B1 | 6/2005 | Dye | |
| 6,908,099 | B2 | 6/2005 | Andersen | |
| D508,221 | S * | 8/2005 | Rebick | D12/162 |
| 6,932,375 | B2 * | 8/2005 | Zahn | 280/482 |
| 6,974,148 | B2 | 12/2005 | Moss et al. | |
| 7,004,492 | B2 | 2/2006 | Moss et al. | |
| 7,021,643 | B1 | 4/2006 | Buchanan | |
| 7,029,022 | B2 | 4/2006 | Moss | |
| 7,081,197 | B1 * | 7/2006 | Davis | 280/507 |
| 7,125,036 | B2 | 10/2006 | Moss et al. | |
| 7,156,412 | B2 | 1/2007 | Andersen | |
| 7,185,904 | B1 * | 3/2007 | Jones et al. | 280/166 |
| 7,204,501 | B2 * | 4/2007 | Bang et al. | 280/166 |
| 7,204,505 | B2 | 4/2007 | Moss | |
| 7,222,510 | B2 | 5/2007 | Andersen | |
| D553,058 | S | 10/2007 | Chen et al. | |
| D629,338 | S * | 12/2010 | Ceccarelli et al. | D12/162 |
| 7,850,192 | B2 * | 12/2010 | Ceccarelli et al. | 280/478.1 |
| 8,033,563 | B2 * | 10/2011 | Good | 280/490.1 |
| 2003/0132605 | A1 * | 7/2003 | Wiers | 280/468 |
| 2011/0285104 | A1 * | 11/2011 | Wotherspoon | 280/164.1 |
| 2012/0217724 | A1 * | 8/2012 | Works | 280/490.1 |

\* cited by examiner

ADJUSTABLE HITCH ASSEMBLY

CROSS-REFERENCE TO RELATED APPLICATION

This application claims benefit from U.S. Provisional Patent Application No. 61/194,987, entitled "Adjustable Hitch Assembly," filed on Oct. 2, 2008, which is hereby incorporated in its entirety by reference.

FIELD OF INVENTION

The present invention relates generally to a towing apparatus, and more particularly, to an improved trailer hitch assembly.

BACKGROUND

For many years, trailers have been used to transport goods from place to place. Generally, trailers do not have an independent source of power, and therefore, must be coupled with a powered form of transportation. Long ago, trailers such as wagons or carriages were coupled to horses by connecting the trailer to the horse's harness. More recently, trailers are connected to motorized vehicles such as cars, trucks and the like.

Many methods and devices have been developed for connecting trailers to vehicles. Such devices include receiver hitches (e.g. pin hitches and ball hitches), gooseneck hitches, fifth wheel hitches, and other types of commonly known hitches. Typical receiving hitches often include a receiving member connected to a vehicle, a ball or pin member connected to the receiving member, and a coupler member connected to the trailer and engaged with the ball member.

FIG. 1 illustrates a prior art version of a receiver hitch 30. The receiver hitch 30 includes a ball member 32 that may be connected to an adjustable member 34. The adjustable member 34 is pinned to a base 36. To adjust the height of the ball member 32, the pins must be removed and the adjustable member 34 may then be aligned with different pinholes. The pins may then be reinserted.

While receiver hitches similar to the receiver hitch 30 illustrated in FIG. 1 may be effective devices for connecting a trailer to a vehicle, problems exists with these designs. The prior art hitches include parts that must be removed in order to adjust the height of the hitch ball or move the hitch ball into a storage position. In addition, loose parts can be lost or allow for theft of the hitch components. The prior art hitches also require tools to change the hitch ball from one size to another. Therefore, there is a need in the art for an improved and easier to use adjustable ballmount hitch to overcome these and other disadvantages.

DESCRIPTION OF THE DRAWINGS

Objects and advantages together with the operation of the invention may be better understood by reference to the following detailed description taken in connection with the following illustrations, wherein.

SUMMARY OF INVENTION

The present invention is directed to an adjustable hitch assembly for coupling a towed vehicle with a towing vehicle. An embodiment of the adjustable hitch assembly may include a base member, a ball support member, and a hitch ball member. The base member may include a connecting portion and a shank member, wherein the shank member may extends perpendicularly away from the connecting portion. The ball support member may include a support rod extending perpendicularly away from the shank member. The ball support member may also include an opening there though that may be attached to the shank member. The hitch ball member may be attached to the support rod, wherein the hitch ball member may have at least one accessory aperture. The connecting portion may be attached to the towing vehicle and the hitch ball member may be attached to the towed vehicle.

DETAILED DESCRIPTION

Figure 1:
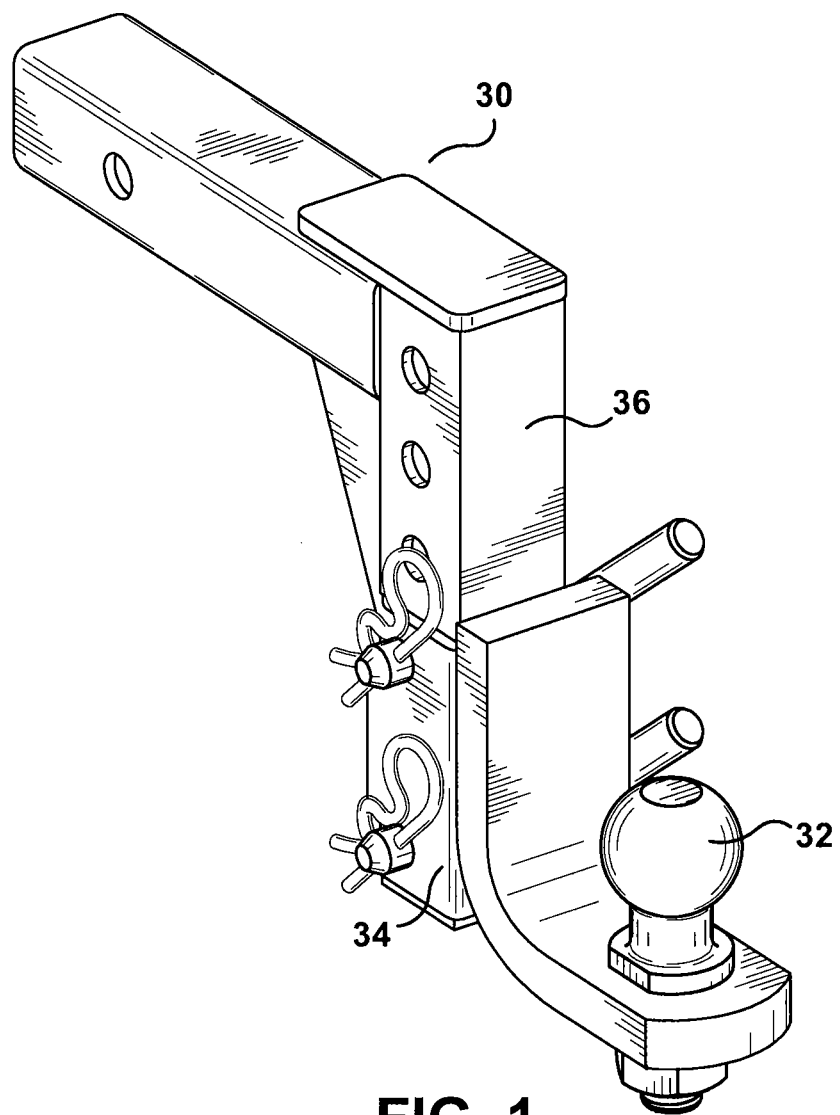
FIG. 1 illustrates a perspective view of a prior art hitch assembly.
Figure 2:
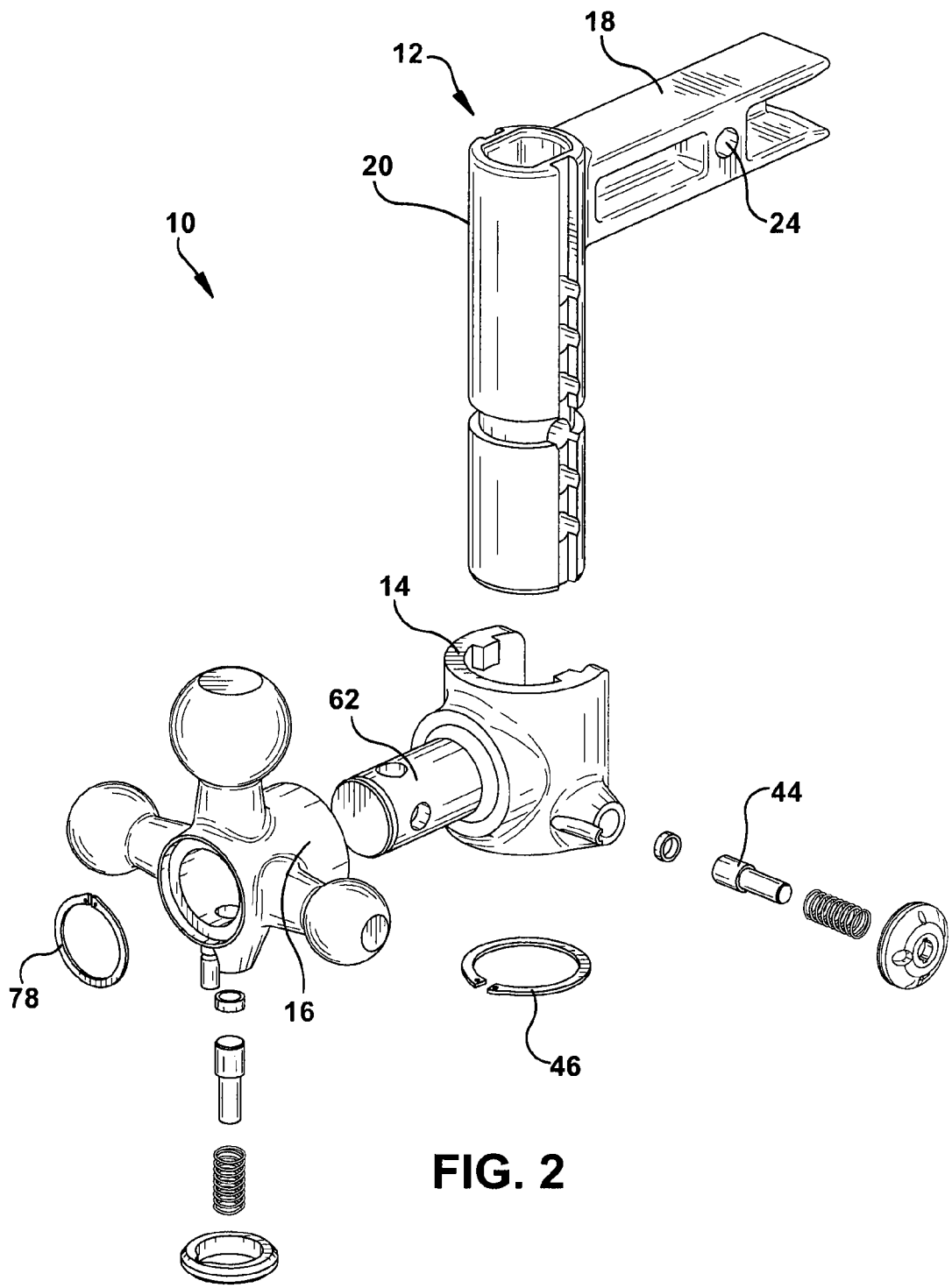
FIG. 2 illustrates an exploded view of an embodiment of an adjustable hitch assembly.
Figure 3:
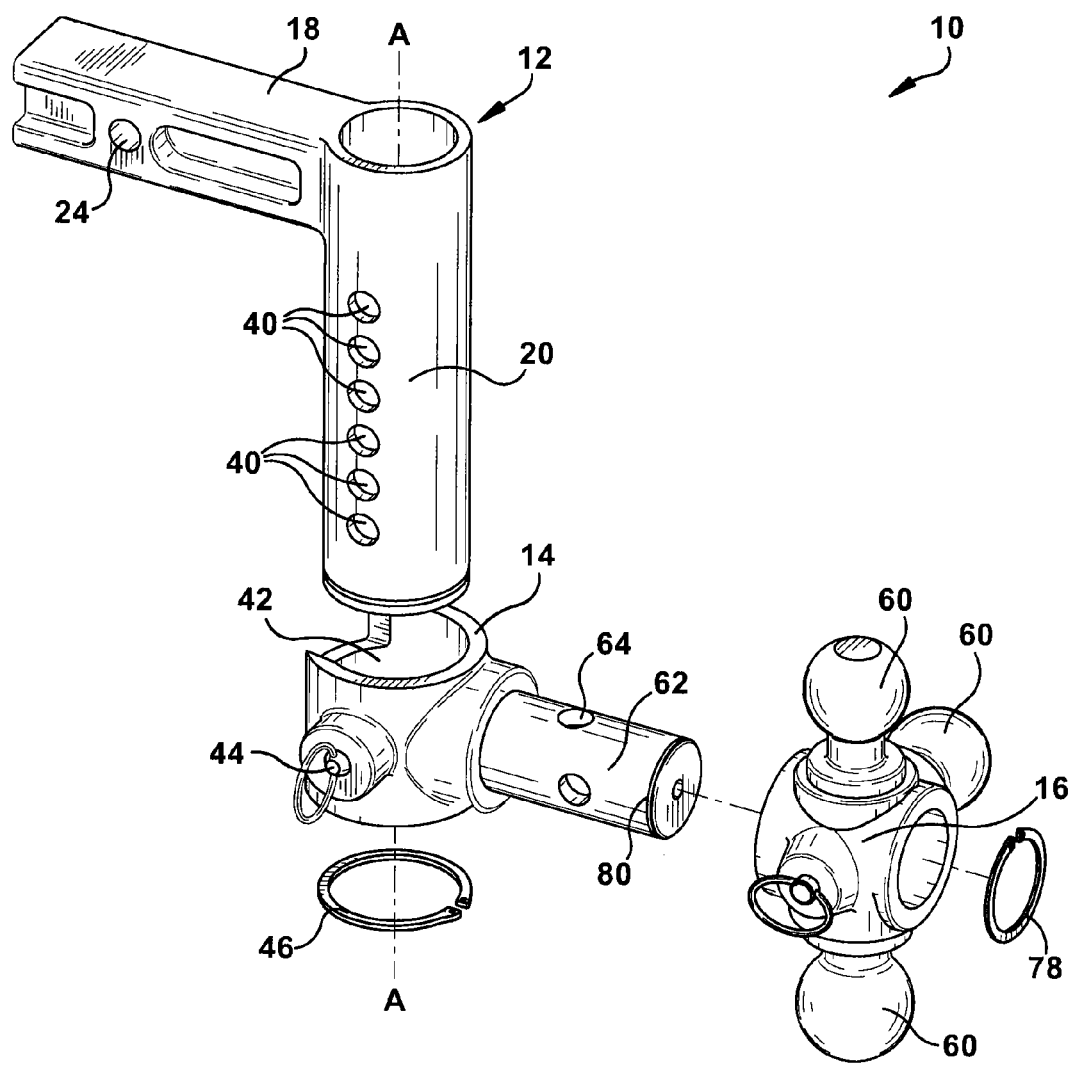
FIG. 3 illustrates another exploded view of an embodiment of the adjustable hitch assembly.

The present invention relates to an adjustable hitch assembly 10 for connecting a trailer to a vehicle. Unlike the prior art, the adjustable hitch assembly 10 may utilize a heavy duty ball mount system rated at 12,000 lbs that may allow for vertical adjustment, choice of hitch ball sizes, and the ability to store the hitch balls in an out of the way storage position without having to remove pins or use tools. As illustrated in FIGS. 2 and 3, an adjustable hitch assembly 10 may include a base member 12, a ball support member 14, and a hitch ball member 16. The hitch assembly 10 may connect to a vehicle and a trailer, thereby linking the trailer to the vehicle.

The base member 12 may include a connecting portion 18 and a shank member 20. The connecting portion 18 may be connected to the shank member 20. In one embodiment, the connecting portion 18 may extend perpendicularly from one end of the shank member 20. While FIGS. 2 and 3 illustrate the connecting portion 18 extending perpendicularly from the shank member 20, the connecting portion 18 and shank member 20 may also be arranged in alternate configurations.

Figure 4:
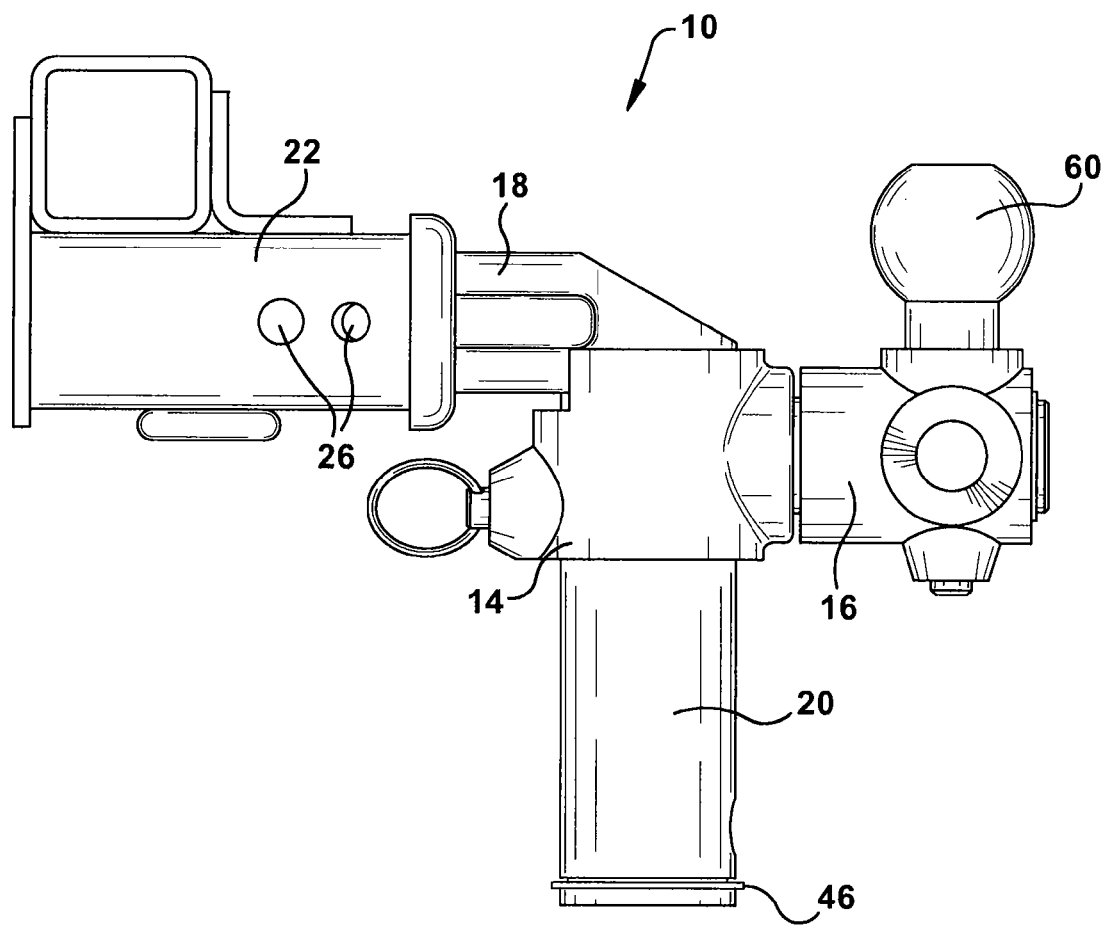
FIG. 4 illustrates a side view of an embodiment of the adjustable hitch assembly connected to a receiving member.

The connecting portion 18 may connect to a vehicle. In one example, the connecting portion 18 may connect to a receiving member 22 mounted to a vehicle, as illustrated in FIG. 4. The receiving member 22 may have an opening (not shown) sized and shaped similar to that of the connecting portion 18, whereby it is configured to receive the connecting portion 18. The receiving member 22 may be attached to the vehicle by any appropriate means, such as by being welded to the frame of the vehicle, secured under the bumper of the vehicle, or connected to the vehicle by other means commonly known to those skilled in the art.

The receiving member 22 may have one or more connecting apertures 26. The connecting apertures 26 may secure the connecting portion 18 to the receiving member 22. The connecting portion 18 may include a pinhole 24. The pinhole 24 may be configured to align with the connecting holes 26 in the receiving member 22 when the connecting portion 18 is inserted into the receiving member 22. When the holes 26, 24 are aligned, the connecting portion 18 may be secured in place by inserting a pin (not shown) through holes 24, 26.

As illustrated in FIG. 3, the shank member 20 may extend perpendicularly from one end of the connecting portion 18. The shank member 20 may be shaped and sized to engage the ball support member 14. In one embodiment, the shank member 20 may be substantially cylindrical in shape, having an axis A-A defined by the center points of the cylinder. By using a round vertical post for the shank member 20 the adjustable hitch assembly 10 may be easily rotated into the storage position.

The shank member 20 may include at least one opening 40 along its surface. As illustrated in FIG. 3, the shank member 20 may have a hollow interior with the at least one opening 40 extending through the surface of the shank member 20. In one embodiment shown in FIG. 3, the shank member 20 may include a plurality of openings 40 arranged linearly along the surface of the shank member 20, and a corresponding set of openings (not shown) located on the opposite side of the shank member 20, whereby the openings may be arranged similar to the first plurality of openings 40 and located 180 degrees opposite the first plurality of openings 40. While FIG. 3 illustrates a plurality of openings 40 aligned linearly, it should be appreciated that the shank member 20 may include any number of openings 40 arranged in any configuration.

The ball support member 14 may include an opening 42. The opening 42 may be sized and shaped to receive the shank member 20. In one embodiment, the opening 42 may be of a substantially cylindrical shape. When the shank member 20 is inserted into the opening 42, as shown in FIG. 5A, the ball support member 14 may be movable along the axis A-A and rotatable about the axis A-A.

The adjustable hitch assembly 10 may be configured to prevent the ball support member 14 from sliding off of the shank member 20. At one end of the shank member 20, the connecting portion 18 may prevent the ball support member 14 from sliding off, as illustrated in FIGS. 2 and 3. At the other end of the shank member 20, a snap ring 46 may be connected to a groove 38 located at an end of the shank member 20 to prevent the ball support member 14 from sliding off of that end, as shown in FIGS. 2-4. Alternatively, any other appropriate means may be used to prevent the ball support member 14 from sliding off either end of the shank member 20.

The ball support member 14 may also include at least one pin member 44. The pin member 44 may be connected to a side of the ball support member 14. The pin member 44 may be removable from the ball support member 14, or fixably connected to the ball support member 14. The pin member 44 may extend into the opening 42. In one embodiment, the pin member 44 may be a spring-loaded integral lock pin that may be fixed to the ball support member 14. The spring-loaded pin 44 may be biased toward the center of the opening 42. In addition, there aren't any pins or clips to remove and lose due to the built-in spring loaded lock pin 44 feature. While FIG. 5 illustrates a ball support member 14 with one pin member 44, the ball support member 14 may include more than one pin member 44. In an embodiment, the ball support member may include two pin members 44 arranged 180 degrees opposite to each other.

Figure 5A:
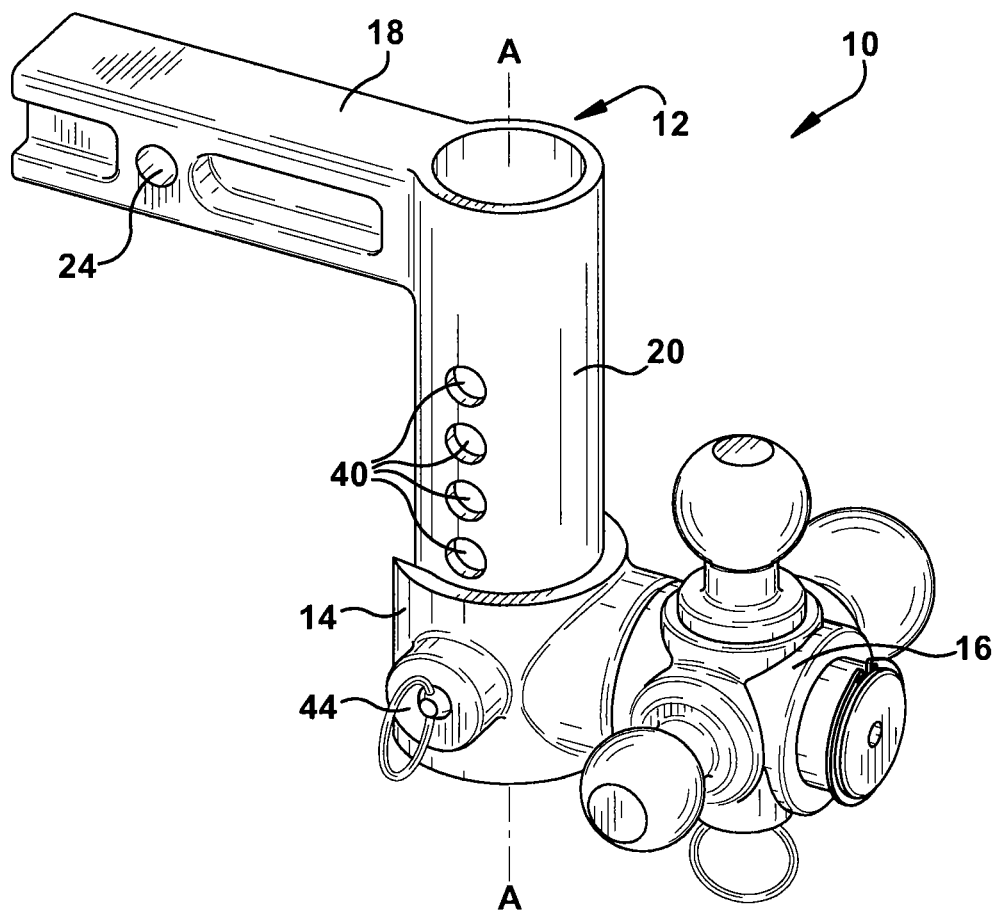
FIG. 5A illustrates a perspective view of an embodiment of the adjustable hitch assembly in a first position.
Figure 5B:
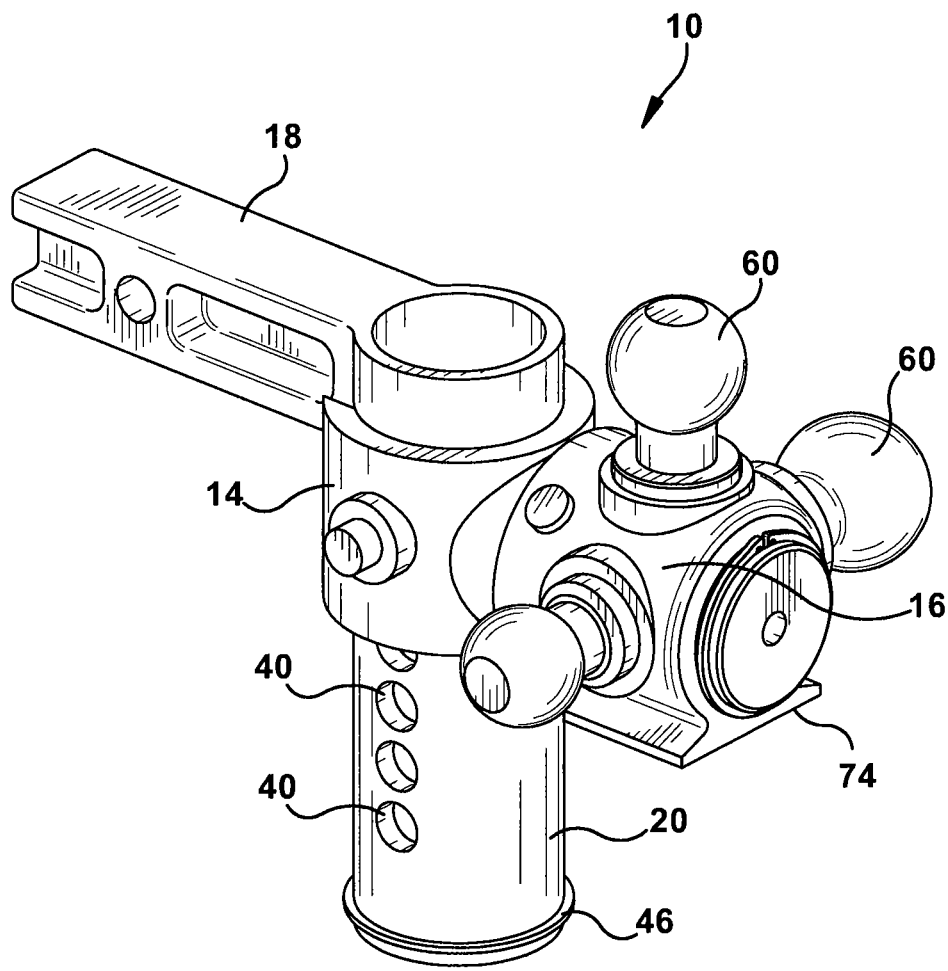
FIG. 5B illustrates a perspective view of an embodiment of the adjustable hitch assembly in a second position.

The ball support member 14 may be secured into place on the shank member 20 by aligning the pin member 44 with the desired opening 40 at the desired height and location along the shank member 20, as shown in FIGS. 5A and 5B. The pin member 44 may be inserted into the selected opening 40 to lock the ball support member 14 in place, thereby preventing the ball support member 14 from moving along the axis A-A or rotating about the axis A-A.

Figure 6:
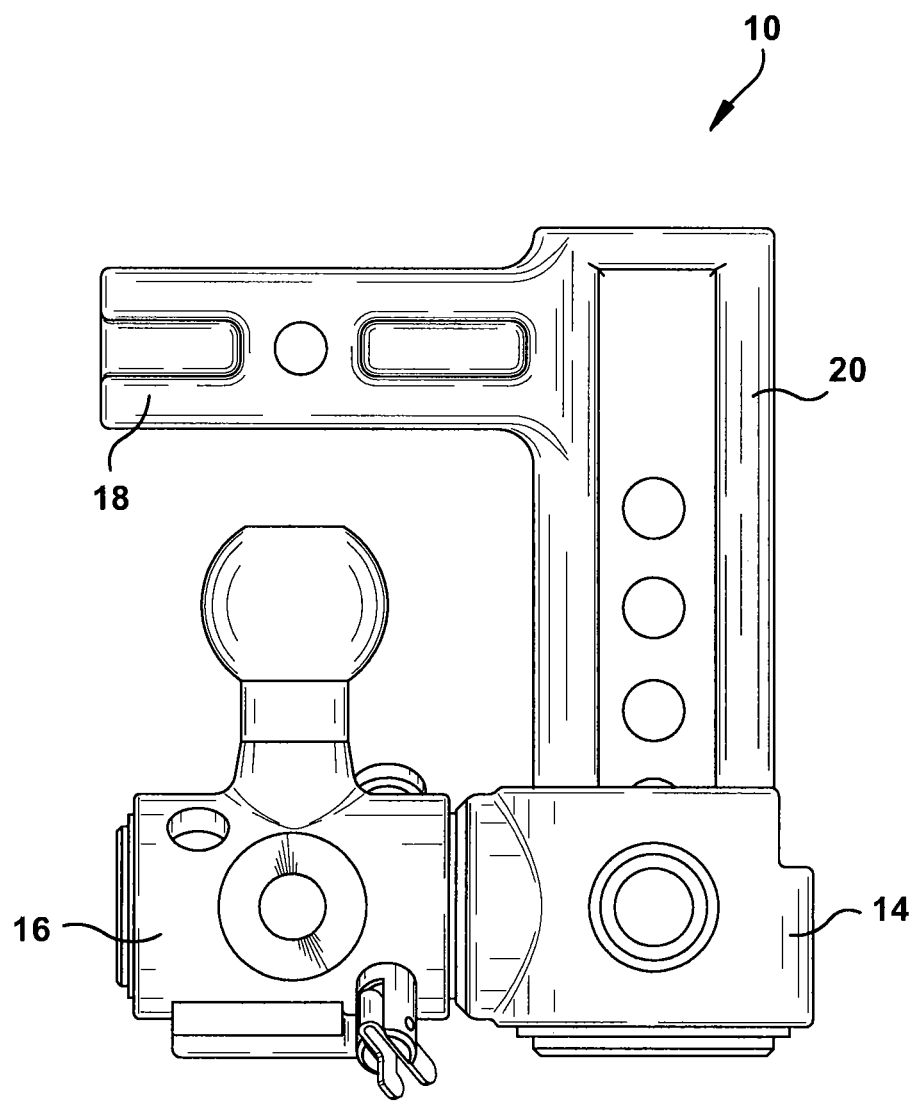
FIG. 6 illustrates a side view of an embodiment of the adjustable hitch assembly in a storage position.

The ball support member 14 may be configured to a towing position, where the hitch ball member 16 may extend away from the connecting member 18, as shown in FIGS. 5A and 5B. To store the hitch ball member 16, the ball support member 14 may be rotated into a storage position, as shown in FIG. 6. To move the ball support member 14 from a towing position to a storage position, the pin member 44 may be removed from the opening 40 in the shank member 20. The ball support member 14 may be rotated about the axis A-A approximately 180 degrees and moved along the axis A-A, such that the pin member 44 may be aligned with a second opening (not shown), approximately 180 degrees opposite the first opening 40. The pin member 44 may be inserted into the second opening, securing the ball support member 14 into the storage position.

Figure 7:
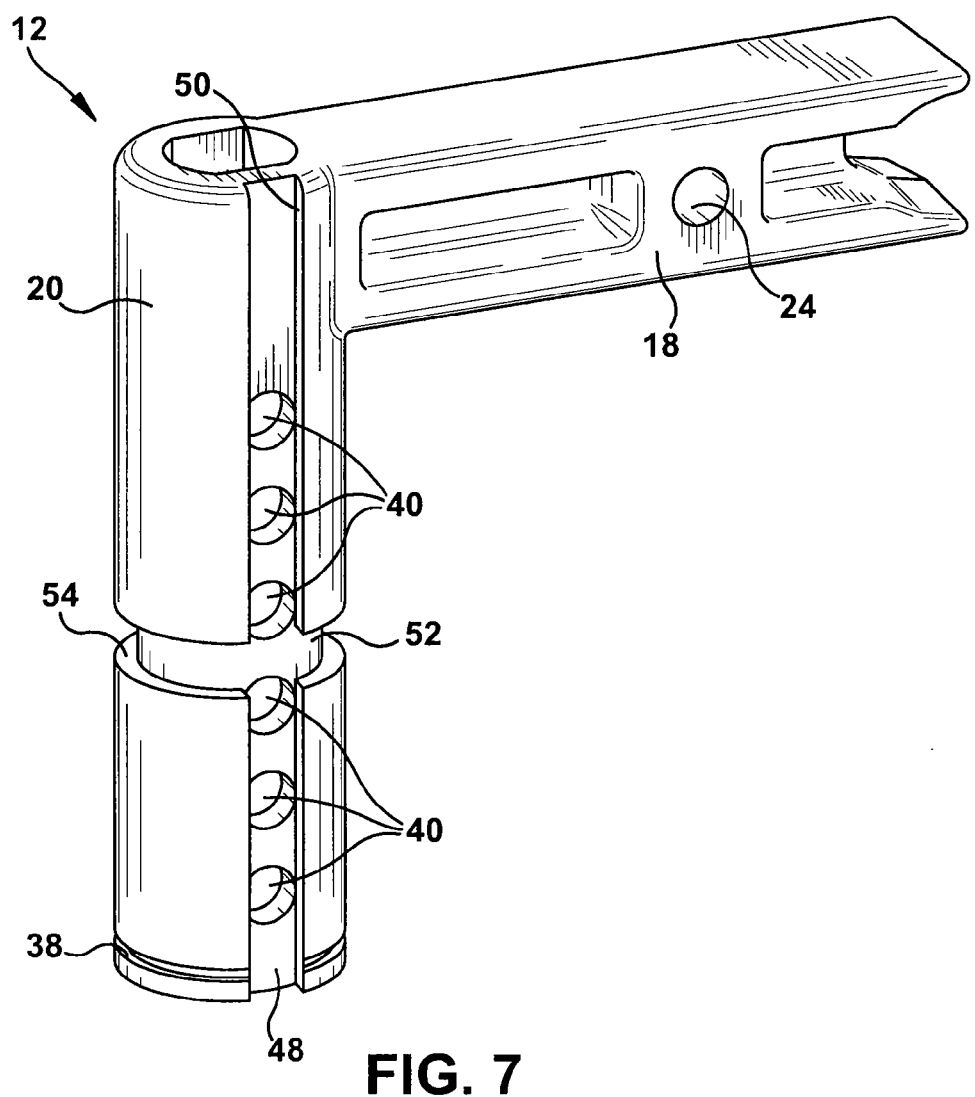
FIG. 7 illustrates a perspective view of a base member of the adjustable hitch assembly.

In one embodiment, the shank member 20 may include one or more guiding slots 48, as shown in FIG. 7. The guiding slot 48 may consist of a recessed area in the outer surface of the shank member 20, formed between two inner sidewalls 50. The inner sidewalls 50 may be substantially parallel to the axis A-A.

The shank member 20 may also include at least one slot member 52, as shown in FIG. 7. The slot member 52 may consist of a recessed area in the outer surface of the shank member 20, formed between two inner sidewalls 54. The inner sidewalls 54 may be substantially parallel to each other. The slot member 52 and the corresponding inner sidewalls 54 may extend around the outer circumference of the shank member 20. The horizontal and vertical inner sidewalls 50, 54 may be discontinuous, with a break in the wall where the guiding slot 48 and the slot member 52 intersect. While FIG. 7 shows the openings 40 located, within the guiding slot 48, the openings may also be located at any other position on the surface of the adjustable member 20.

Figure 8:
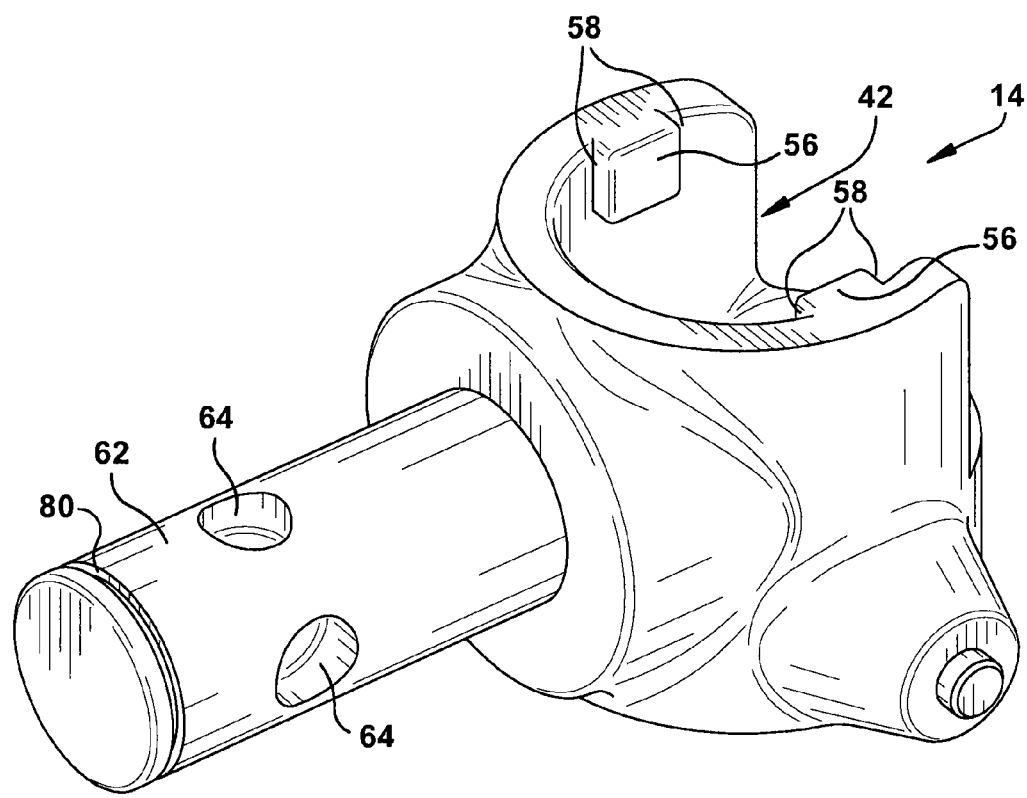
FIG. 8 illustrates a perspective view of the ball support member of the adjustable hitch assembly.

FIG. 8 illustrates the ball support member 14. The ball support member 14 may include at least one key 56, located on an interior surface of the opening 42 of the ball support member 14. The key 56 may include outer sidewalls 58 that may extend into the opening 42, as shown in FIG. 8. There may be two keys 56 located within the opening 42. While the two keys 56 are shown being located opposite of one another, it is understood that they may be located at any appropriate position in the ball support member 14, such that they may correspond to the location(s) of the guiding slot(s) 48 on the shank member 20.

The size and shape of each key 56 may correspond to the size and shape of the guiding slot 48 and slot member 52, such that the key 56 may move within the guiding slot 48 and slot member 52. The round vertical shank member 20 allows the hitch ball member to slide and adjust easily up and down the post with a key 56 in groove 48, 52 feature to keep the components aligned while adjusting the height or location of the hitch assembly 10. By way of example, the guiding slot 48 may have a width W between the inner sidewalls 50 and a depth D. The slot member 52 may have a height H between the inner sidewalls 54 and a depth D. The key 56 may then have a width slightly less than W, a height slightly less than H, and a depth slightly less than D.

When the shank member 20 is inserted into the opening 42 in the ball support member 14, the key 56 may be aligned with the guiding slot 48 and may fit inside the guiding slot 48 and the slot member 52. The ball support member 14 may then be movable along the paths of the guiding slot 48 and the slot member 52 to position the ball support member 14 at the desired location. While FIG. 8 illustrates a ball support member 14 having two keys 56, it should be appreciated that a ball support member 14 may have one or any number of keys 56.

As illustrated in FIG. 8, the ball support member 14 may also include a support rod 62. The support rod 62 may be integrally formed in the ball support member 14, or may be removably connected to the ball support member 14 by any appropriate means, such as fasteners, welding or the like. The support rod 62 may include at least one aperture 64 located on the surface of the support rod 62. While shown as having more than one aperture 64 located radially around the support 62, it is to be understood that the support rod 62 may have any number of apertures 64 located at any appropriate location on the support rod 62.

The support rod 62 may be shaped and sized to engage a similarly shaped opening 66 located in the hitch ball member 16. While FIG. 8 illustrates a cylindrically shaped support rod 62, it is to be understood that the support rod 62 may be of any appropriate shape or size, such as correspondingly shaped and size to fit within the opening 66 in the hitch ball member 16. The support rod 62 may also include a groove 80 located at an end. A snap ring 46 may be connected to the groove 80 located at an end of the support rod 62 to prevent the hitch ball member 16 from sliding off of that end, as best shown in FIGS. 3 and 5A.

Figure 9:
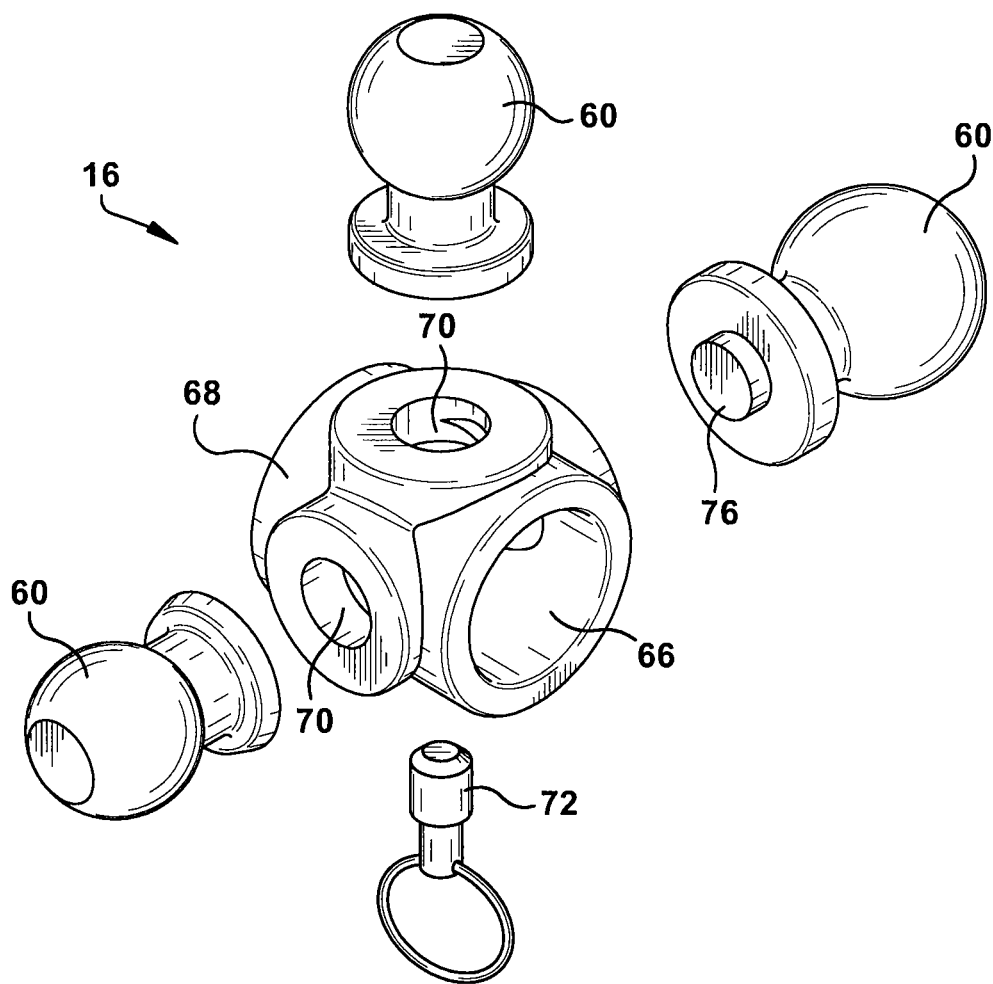
FIG. 9 illustrates a perspective view of the hitch ball member of the adjustable hitch assembly.

FIG. 9 illustrates the hitch ball member 16. The hitch ball member 16 may include a main body member 68 with an opening 66 located there through. The opening 66 may be correspondingly shaped and sized to receive the support rod 62 there through. The hitch ball member 16 may have one or more hitch balls 60 connected to the main body member 68. In one embodiment, the hitch balls 60 may be integrally formed with the body member 68. The hitch balls 60 may also be removably connected to the hitch ball member 16.

In an embodiment, the hitch ball member 16 may include three hitch balls 60 of varying sizes and diameters that may be connected to the body member 68. The cylindrically shaped opening 66 in the body member 68 may allow the hitch ball member 16 to rotate about the cylindrically shaped support rod 62 when the pin 72 is not inserted into an aperture 64 in the support rod 62. While the hitch balls 60 are shown extending radially from the opening 66 and configured approximately 90 degrees apart from each other, it is to be understood that the hitch balls 60 may be positioned in any appropriate manner or location on the body member 68.

As shown in FIG. 9, the body member 68 may have one or more openings 70 for attaching devices or accessory members, such as a hitch ball 60, for example. Other devices or accessory members, such as a step, a light, or other useful devices may also be attached to the openings 70 or accessory apertures. The devices to be attached may include a projection 76 located the end to be inserted into the opening 70. The projection 76 may be threaded, provide a compression fit or the like, to aid in attachment to the body member 68. The openings 70 may be threaded to receive a threaded portion of the hitch ball 60. Alternatively, the hitch balls 60 may connect to the hitch ball member 16 by welding, a compression fit, or by any other appropriate means known to those having skill in the art.

The hitch ball member 16 may include a pin 72 for securing the hitch ball member 16 to the ball support member 14. The pin 72 may be located within the main body member 68 and spring biased toward the center of the body member 68. The pin 72 may be removably connected to ball hitch member 16. The pin 72 may be a spring loaded integral lock pin. Using a spring loaded lock pin 72 prevents any pins or clips from being removed and lost since it is built-in. When the support rod 62 is inserted through the opening 66 in the body member 68, the pin 72 may align with an aperture 64 and be inserted into the aperture 64, thereby locking the ball hitch member 16 in the desired location on the ball support member 14. The hitch ball member 16 may quickly and easily rotate into the storage position without having to remove any pins and/or clips. In addition, the hitch balls 60 may rotate about the horizontal support rod 62 and lock into place with the spring loaded integral lock pin 72.

Figure 10:
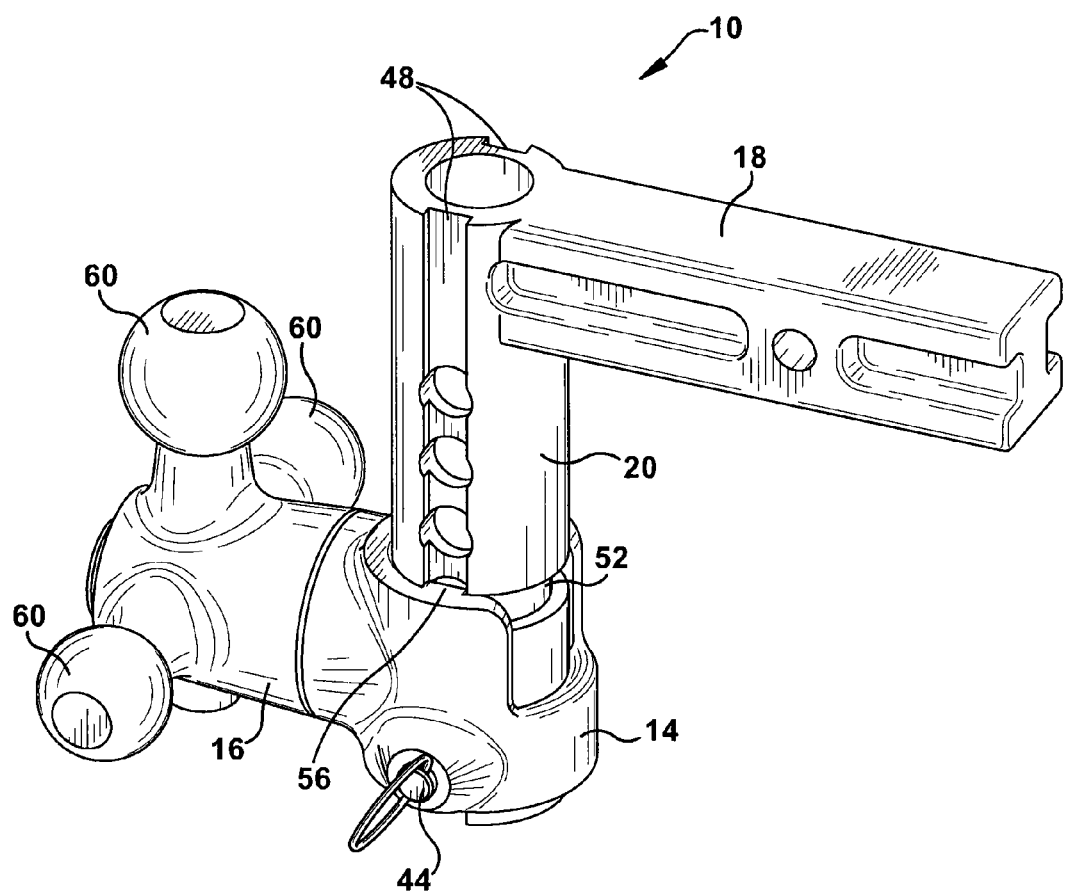
FIG. 10 illustrates a perspective view of an embodiment of the adjustable hitch assembly.

In an embodiment shown in FIG. 10, the shank member 20 may include two guiding slots 48 located approximately 180 degrees opposite of each other. The ball support member 14 may have two keys 56 configured to align with and move along the two guiding slots 48 when the pin member 44 is aligned with an opening 40. Removing the pin member 44 from the opening 40 may allow the ball support member 14 to move along the path of the guiding slot 48.

The inner sidewalls 50 may prevent the outer sidewalls 58 of the keys 56 from moving substantially perpendicular to the guiding slot 48, thereby preventing the ball support member 14 from rotating about the axis A-A. To rotate the ball support member 14, the keys 56 may be moved along the guiding slot 48 to align with the position of the slot member 52. The ball support member 14 may be rotated about the axis A-A, into the desired location, such as a storage position. The pin member 44 may then be inserted into a second opening (not shown), to lock the ball support member 14 into the storage position.

As illustrated in FIG. 10, the ball support member 14 may include one more hitch balls 60 connected to the ball support member 14, such as three hitch balls 60, for example. In one embodiment, the hitch balls 60 may be integrally formed with the ball support member 14. The hitch balls 60 may also be removable from the ball support member 14. By way of example, the hitch balls 60 may be connected to the hitch ball member 16 that is removable from the ball support member 14.

The hitch ball member 16 may be rotated to set the desired sized hitch ball 60 at a hitch position, such as at a substantially parallel position to that of the adjustable member 20, as shown in FIG. 10. The apertures 64 in the support rod 62 may be spaced approximately 90 degrees apart and configured to align with an opening 70 in the hitch ball member 16 any time a hitch ball 60 is in the hitch position. A user may remove the pin 72 from the aperture 64, rotate the hitch ball member 16 to set the desired hitch ball 60 in the hitch position, and then re-insert the pin 72 into the corresponding aperture 64 to secure the hitch ball member 16 into place. As discussed above, the components may be securely attached with snap rings 46, 78 to offer a complete assembled hitch assembly 10 that can be secured or locked to the vehicle using only one hitch lock pin. The snap rings 46, 78 may also be easily removed for easy servicing of the adjustable hitch assembly 10 if necessary.

Figure 11A:
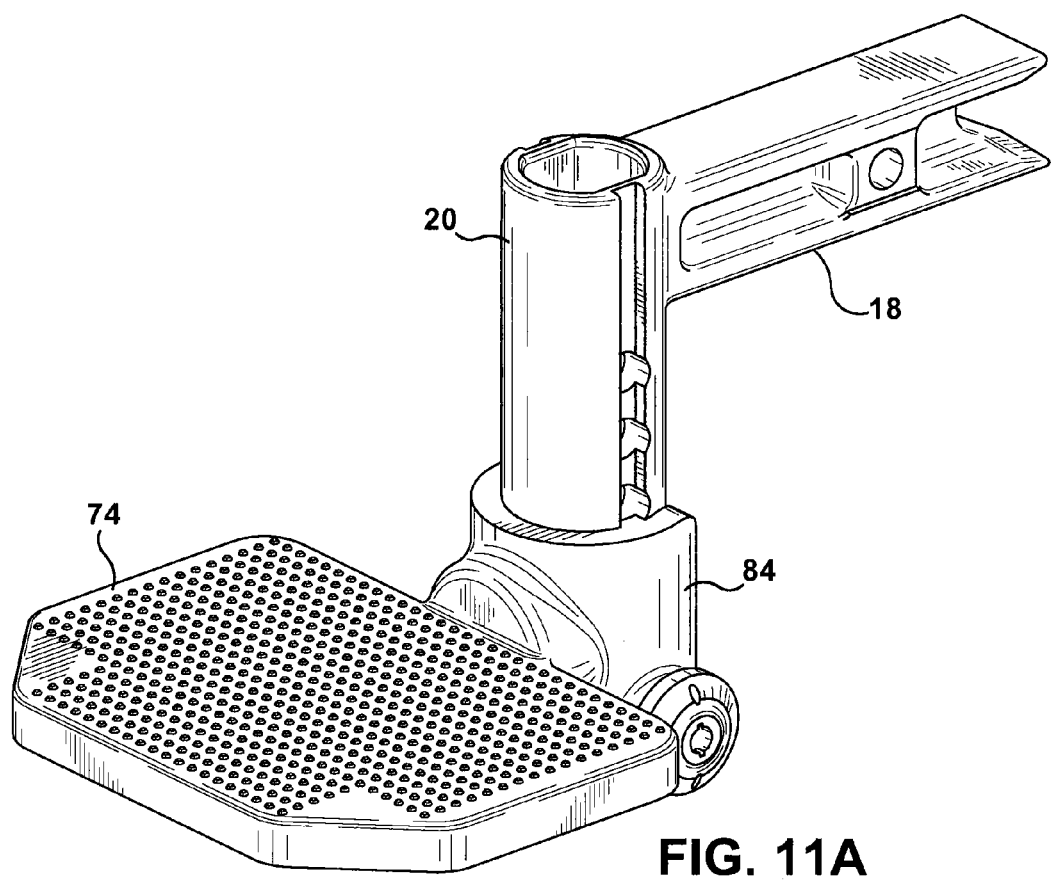
FIG. 11A illustrates a perspective view of an embodiment of the adjustable hitch assembly having a step.
Figure 11B:
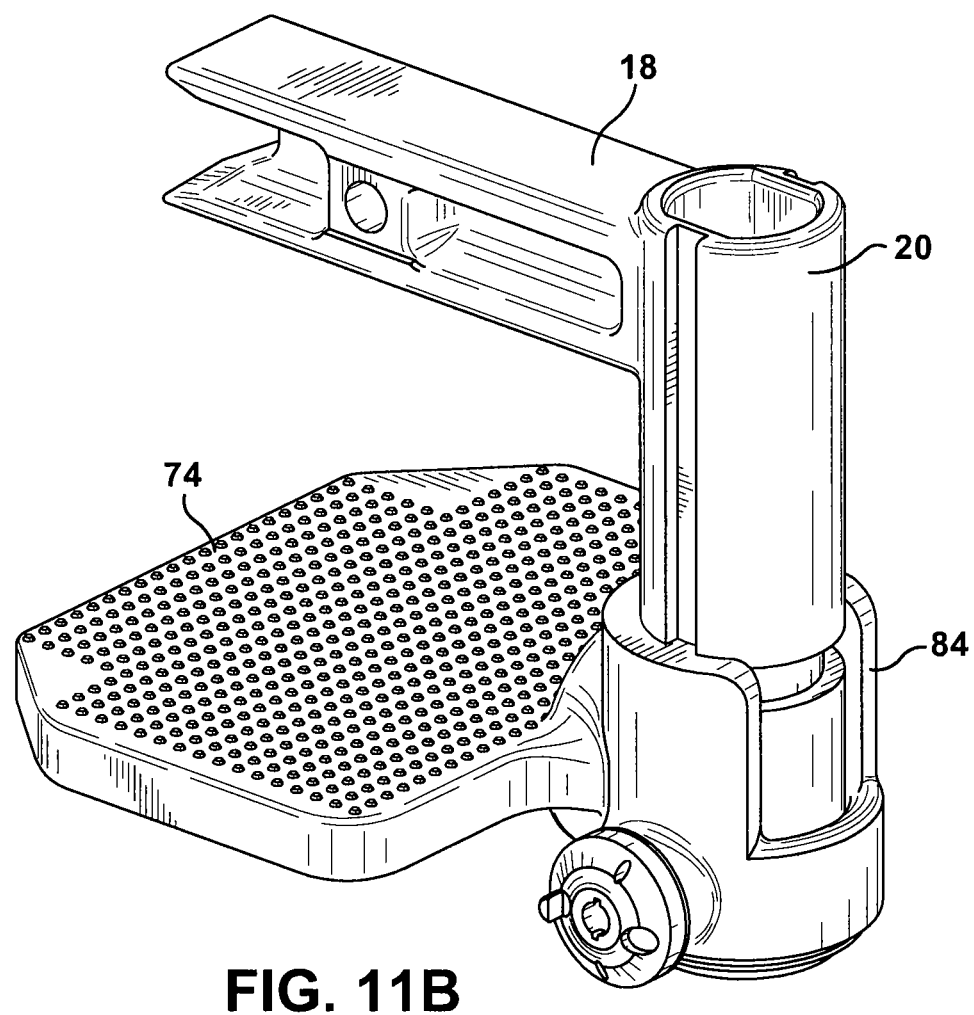
FIG. 11B illustrates a perspective view of an embodiment of the adjustable hitch assembly having a step in a storage position.

FIGS. 11A and 11B illustrate an alternative embodiment of the adjustable hitch assembly 10 that may also include a step 74. The step 74 may be of any appropriate shape or size. The step 74 may connect to the adjustable hitch assembly 10 such that it may be adjustable along the shank member 20. For example, the step 74 may be connected directly to a ball support member 84. In this embodiment, the ball support member 84 may be of a different shape or size to connect with the step 74. The step 74 and ball support member 84 may be integrally formed or attached by any appropriate means, such as fasteners, welding or the like, for example. The step 74 may be moved from step position, shown in FIG. 11A, to storage position, as shown in FIG. 11B, by rotating the ball support member 14 to the storage position.

Figure 12:
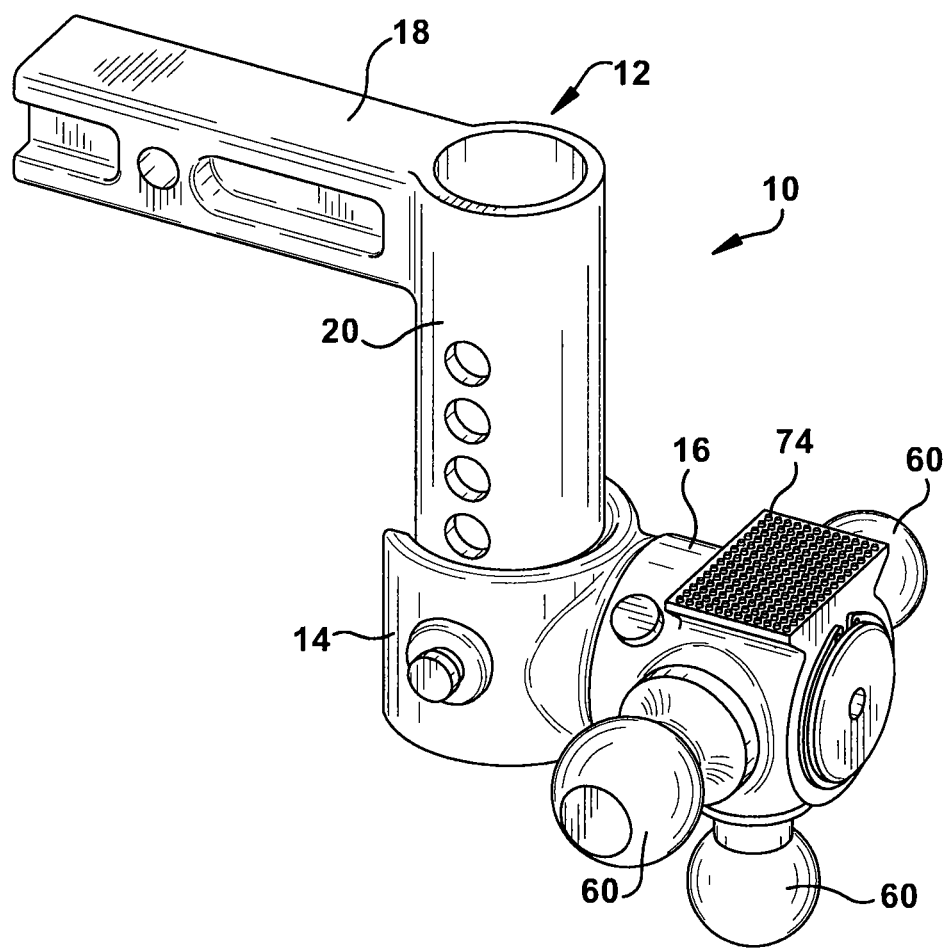
FIG. 12 illustrates a perspective view of an embodiment of the adjustable hitch assembly having a step connected to the hitch ball member.

In another alternative embodiment, the step 74 may be connected or integrally formed to the hitch ball member 16, as shown in FIGS. 5B and 12. The hitch ball member 16 may include the step 74 and one or more hitch balls 60. The step 74 may be moved to step position by rotating the hitch ball member 16 about the support rod 62 until the step 74 is in the step position, as shown in FIG. 12.

Figure 13:
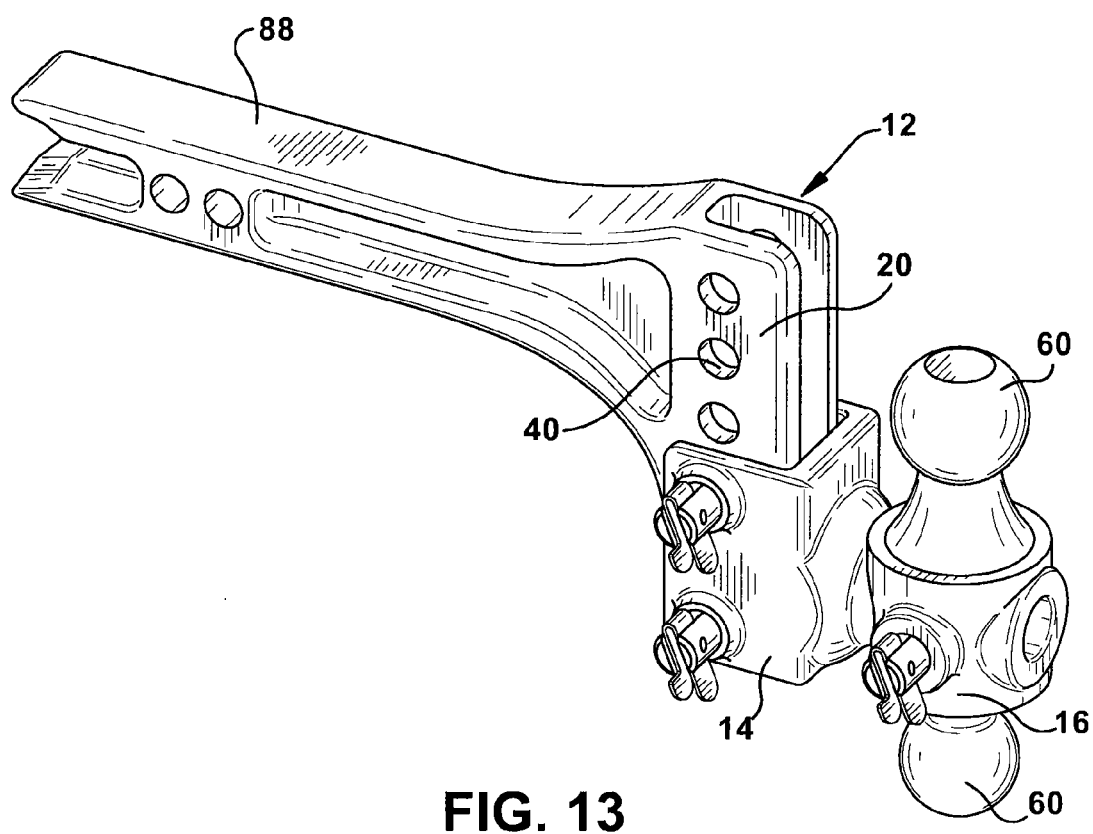
FIG. 13 illustrates a perspective view of an embodiment of an adjustable hitch assembly using a weight distributing hitch bar.
Figure 14:
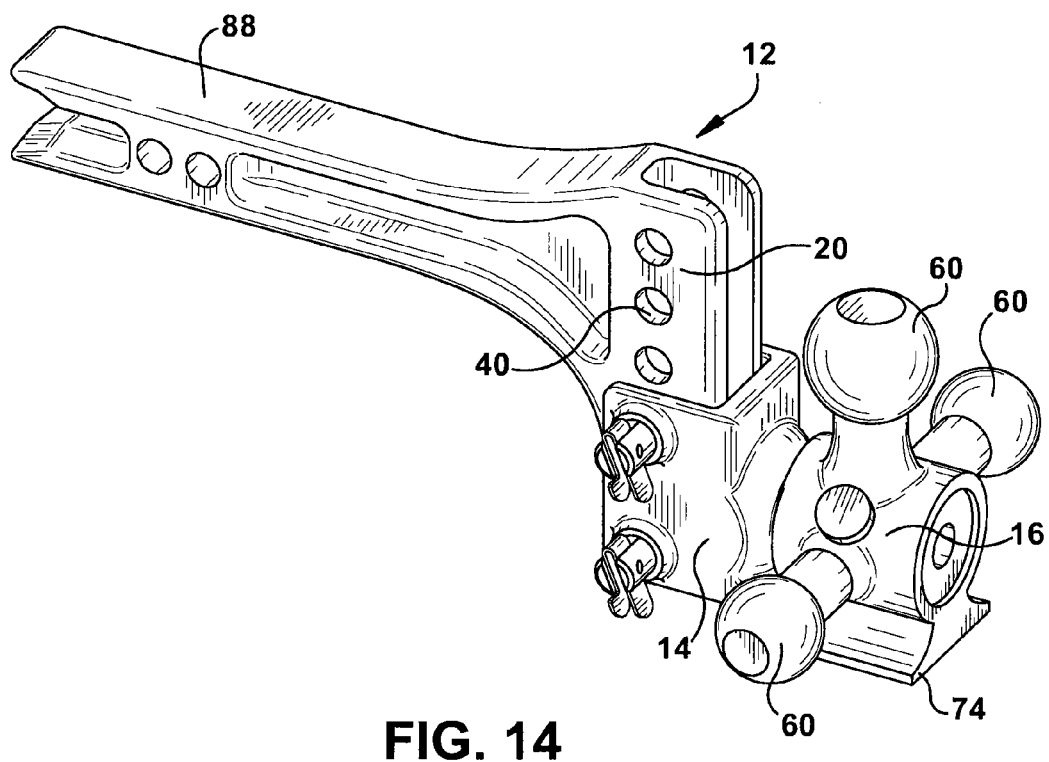
FIG. 14 illustrates a perspective view of an embodiment of an adjustable hitch assembly using a weight distributing hitch bar.

FIGS. 13 and 14 illustrate additional alternative embodiments of an adjustable hitch assembly 10. The base member 12 in these embodiments may utilize a notched end hitch bar or hitch bar 88. Utilizing a notched end hitch bar 88 may absorb a portion of the reaction load that may be applied during operation of the adjustable hitch assembly 10.

The invention has been described with reference to the embodiments. Obviously, modifications and alternations will occur to others upon a reading and understanding of this specification. The claims as follows are intended to include all modifications and alterations insofar as they come within the scope of the claim or an equivalent thereof.

Having thus described the invention, we claim:

1. An adjustable hitch assembly comprising:
    a base member having a connecting portion and a shank member, wherein said shank member extends generally perpendicularly from said connecting portion;
    a guiding member located along at least one side of said shank member, wherein said guiding member includes a guiding slot;
    a slot member positioned on said shank member and located generally perpendicular to said guiding slot;
    a ball support member having a support rod extending generally perpendicularly from said shank member, wherein said ball support member includes an opening therethrough capable of attachment to said shank member, whereby said ball support member is rotatably adjustable about a generally vertical axis; and
    a hitch ball member capable of attachment to said support rod, wherein said hitch ball member has at least one accessory aperture.

2. The adjustable hitch assembly of claim 1, wherein said shank member has at least one opening located along at least one side.

3. The adjustable hitch assembly of claim 2, wherein said ball support member includes a pin member capable of being inserted into said opening in said shank member.

4. The adjustable hitch assembly of claim 2, wherein said ball support member includes at least one key located within said opening of said ball support member.

5. The adjustable hitch assembly of claim 4, wherein said key is in slidable engagement with said guiding slot and said slot member.

6. The adjustable hitch assembly of claim 1 further comprising an accessory member that is capable of being secured to said accessory aperture, said accessory member including at least one hitch ball and at least one generally horizontal surface, wherein said accessory member is rotatable to a first position whereby said hitch ball is operatively positioned and a second position whereby said horizontal surface is operatively positioned.

7. The adjustable hitch assembly of claim 1, wherein said guiding member vertically positions said ball support member and said slot member rotatably positions said ball support member along said shank member.

8. An adjustable hitch assembly for coupling a towed vehicle with a towing vehicle, said adjustable hitch assembly comprising:
    a base member having a connecting portion and a shank member, wherein said shank member extends generally perpendicularly from said connecting portion and said connecting portion is capable of attachment to said towing vehicle and wherein said shank member includes a slot member;
    a ball support member having a support rod extending generally perpendicularly from said shank member, wherein said ball support member includes an opening therethrough capable of attachment to said shank member and configured to rotate along said rotating slot member;
    a hitch ball member capable of attachment to said support rod; and
    an accessory member attached to said hitch ball member.

9. The adjustable hitch assembly of claim 8, wherein said shank member includes a guiding slot located along at least one side.

10. The adjustable hitch assembly of claim 9, wherein said slot member is perpendicular to said guiding slot.

11. The adjustable hitch assembly of claim 10, wherein said ball support member includes at least one key located within said opening of said ball support member.

12. The adjustable hitch assembly of claim 11, wherein said key is in slidable engagement with said guiding slot and said slot member.

13. The adjustable hitch assembly of claim 8, wherein said connecting portion includes an aperture for connecting to said towing vehicle.

14. The adjustable hitch assembly of claim 8, wherein said hitch ball member includes a pin capable of engagement with said support rod.

15. The adjustable hitch assembly of claim 8, wherein said accessory member includes at least one ball member and a step rotatably and vertically adjustable relative to said shank member, wherein said step includes a stepping surface.

16. The adjustable hitch assembly of claim 15, wherein said at least one ball member and said step are integrally formed.

17. The adjustable hitch assembly of claim 15, wherein said at least one ball member of said accessory member includes two ball members.

18. An adjustable hitch assembly comprising:
    a base member having a shank;
    a ball support member selectively secured to said shank;
    a guide positioned on said shank, said guide includes a guiding slot;
    a slot member positioned on said shank and located perpendicular to said guiding slot, wherein said ball support member is vertically adjustable relative to said base along said guide to a plurality of operating positions and rotatably adjustable about a generally vertical axis relative to said base along said slot member; and a hitch accessory member rotatably attached to said ball support member, wherein said hitch accessory member includes a hitch ball and a stepping surface.

19. The adjustable hitch assembly of claim 18, wherein said hitch accessory member is rotatable to a first position whereby said hitch ball is operable and a second position whereby said stepping surface is operable.

20. The adjustable hitch assembly of claim 19, wherein said ball support member includes at least one key and wherein said key is in slidable engagement with said guiding slot and said slot member.

21. The adjustable hitch assembly of claim 19, wherein said hitch accessory member is rotatable about a generally vertical plane.

22. The adjustable hitch assembly of claim 18, wherein said stepping surface includes a base surface and a plurality of protrusion extending above said base surface.

23. The adjustable hitch assembly of claim 18, wherein said hitch ball and said stepping surface are integrally formed.

24. The adjustable hitch assembly of claim 18, wherein said hitch accessory member includes a second hitch ball.

25. An adjustable hitch assembly comprising:
a base member having a shank, said shank having a slot member;
a ball support member selectively secured to said shank and rotatably adjustable about a generally vertical axis relative to said base along said slot member;
a guide positioned on said shank, said guide having at least one open vertically lower most end or upper most end, wherein said ball support member is vertically adjustable relative to said base along said guide and removable from at least one of said open vertically lower or upper most ends, said slot member being located perpendicular to said guide; and
a hitch accessory member attached to said ball support member, wherein said hitch accessory member includes a hitch ball.

26. The adjustable hitch assembly of claim 25, wherein said at least one open end of said guide includes first and second open ends.

27. The adjustable hitch assembly of claim 26, wherein said ball support member is vertically adjustable relative to said base along said guide between said first and second open ends.

28. The adjustable hitch assembly of claim 25, wherein said hitch accessory member includes a step.

29. The adjustable hitch assembly of claim 28, wherein said hitch accessory member is rotatable to a first position whereby said hitch ball is operable and a second position whereby said step is operable.

30. The adjustable hitch assembly of claim 29, wherein said hitch accessory member is rotatable about a generally vertical plane.

31. The adjustable hitch assembly of claim 30, wherein said step includes a base surface and a stepping surface whereby said stepping surface includes a plurality of protrusions extending above said base surface.

32. The adjustable hitch assembly of claim 25, wherein said ball support member is vertically adjustable relative to said base along said guide.

* * * * *